Patented July 8, 1952

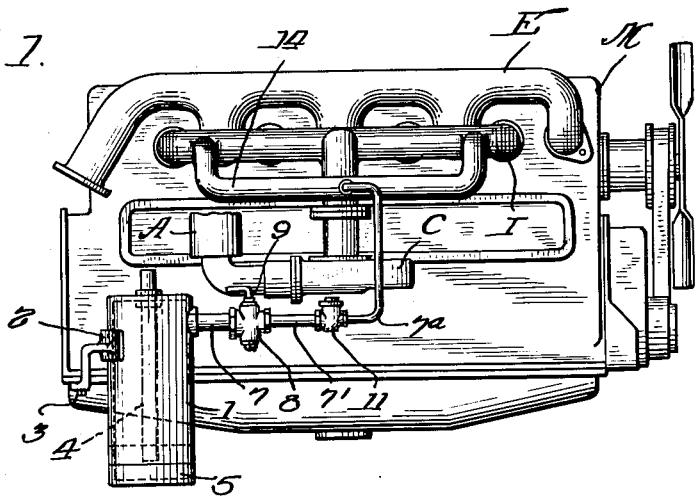
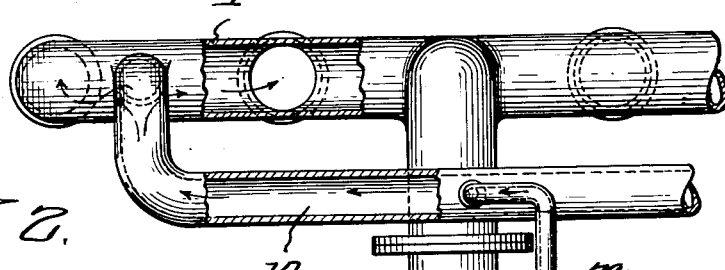
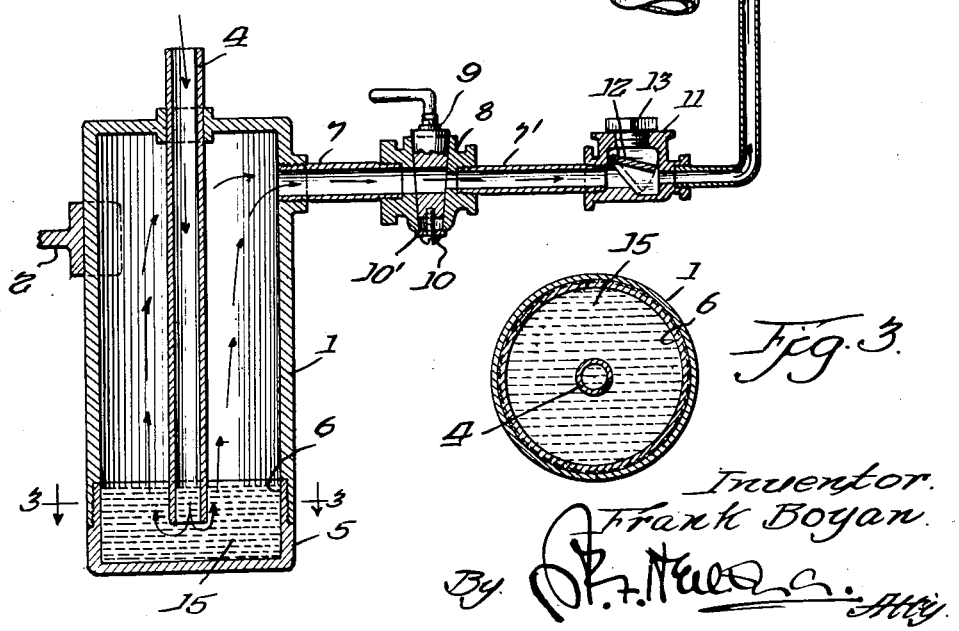

2,602,435

UNITED STATES PATENT OFFICE 2,602,435

AUXILIARY AIR SUPPLYING DEVICE FOR INTERNAL-COMBUSTION ENGINES

Frank Boyan, Waterford, Wis.

Application May 20, 1950, Serial No. 163,239

3 Claims. (Cl. 123—119)

This invention relates to improvements in devices for bettering the combustibility of gaseous charges delivered into the firing chambers of the cylinders of internal combustion engines, having for an object to provide an auxiliary air intake for internal combustion engines, which, when installed in an engine, will function to materially improve the firing efficiency of carburated charge delivered into the cylinders thereof; moreover, effect considerable economies and savings in engine fuel consumption.

An equally important object of the invention is to provide a simple, sturdy and comparatively cheaply produced device of the stated character capable of convenient and ready attachment to an internal combustion engine without material change to or modification thereof, or its equipped charge forming device and which, in operation, will increase the efficiency of said charge forming device mixture delivered into the engine intake manifold, especially by supplying predetermined or metered quantities of clean, pure air, or air entirely free of engine gas contamination or pollution to said charge forming device mixture.

The foregoing, as well as other objects, advantages and meritorious teachings of my invention, will be in part obvious and in part pointed out in the following detailed disclosure thereof, when taken in conjunction with the accompanying drawings, it being understood that the form of the invention presented herein is precise and what is now considered to be the better mode of embodying its principles, but that other modifications and changes may be made in specific embodiments, without departing from its essential features.

In the drawings:

Figure 1 is a side elevation of an internal combustion engine equipped with my invention.

Figure 2 is an enlarged view, in vertical section, through my improved auxiliary air supplying device, showing the air supplying conduit connected to and communicating with an internal combustion engine intake manifold, the latter being fragmentarily shown partially in section and partially in elevation, and Figure 3 is a transverse section taken on the line 3—3 of Figure 2, looking in the direction in which the arrows point.

Referring in detail to the drawings, I have shown the invention attached to a form of internal combustion engine indicated in its entirety by the reference letter M, provided with an intake manifold I, an exhaust manifold E, a carburetor or other charge forming device C connected to and communicating with the intake manifold, and an air cleaner A. It is to be understood, however, that the ambit of the invention is in no manner limited in its adaptation to the engine M, but that the same can be advantageously and operatively installed in various other designs or types.

The improved auxiliary air intake device consists of a housing or tank 1 of suitable shape and size, having a bracket 2 connected thereto whereby fixed mounting on an appropriate portion of the engine M may be effected, as at 3.

The normally upper end of the housing is substantially closed and has a way therein into and through which an air inletting tube 4 is snugly and longitudinally engaged and similarly extended substantially centrally of said housing. The outer and upper open end of the tube is preferably disposed for a distance above the housing while its inner and lower open end is arranged substantially flush with or, if desired, somewhat below the open lower end of the housing. Said air inletting tube is immovably secured to the walls of the way in the housing upper end or wall, as by welding or other suitable means.

A cup or cap-like container 5 of horizontal cross-sectional shape and size substantially corresponding to that of the housing 1 is provided for removable though secure engagement with the open lower end of the same. Of course, different forms of constructions or means for effecting such engagement may be employed, though in the elected embodiment the cup is formed with an upstanding and reduced flange 6 externally screw-threaded for turning engagement into and with a correspondingly screw-threaded portion of the housing open lower end (see Figure 2).

At this point, it is noted that said cup 5, when engaged with the housing, as above described, is substantially filled with a suitable air cleansing liquid, such as kerosene, water, etc., and that the open lower end of the air inletting tube 4 is immersed therein.

An outlet way is formed in a wide wall of the housing 1, preferably in proximity to its substantially closed upper end. Engaged in said outlet way is a conduit section 7 whose outer end is connected to and communicates with one end of the flow-way of a valve casing 8; the remaining end of such flow-way having a second conduit 7' engaged therein. A tapered single way or ported plug valve 9 is rotatably seated in the valve casing and provided with a suitable operating handle for an obvious purpose. Said tapered valve is adjustably retained in its seat in the casing by threadedly engaging a securing screw 10 with its lower end and through an anchoring disc or plate 10' seated on the lower side of said casing over the adjacent end of its valve seat.

A check valve casing 11 is connected to and communicates with the outer end of the conduit section 7'; and as will be noted upon reference to Figure 2 of the accompanying drawings, has a suitable form of check valve mounted and/or seated therein, which may be of the swingable flap type such as indicated by the numeral 12, normally seated as illustrated but movable to an open or partially open position under suction urge applied thereto from the engine intake manifold I as presently described. If desired, the check valve casing 11 may be provided with a clean out opening normally closed by a plug 13 or its equivalent.

A pipe section 7ᵃ is connected at one end to the outlet way or port of the check valve casing 11 and is extended into engagement and communication with a fitting or device 14 whose opposite ends connect and communicate with appropriate portions of the intake manifold I as is well shown in Figures 1 and 2 of the drawings.

In view of the above, it will be seen that with operation of the internal combustion engine M, a suction will be set up and maintained in the intake manifold I. A portion of the suction will be exerted upon or applied to the sectional conduit line 7—7'—7ᵃ, thus drawing air into the housing 1 of the auxiliary intake device via the air inletting tube 4, from its open lower end into and through the liquid 15 contained in the housing cup 5, following which the now cleansed air rises in and through the housing 1 in the direction indicated by the arrows and discharges into said sectional conduit line for delivery into the intake manifold I, as above described, and ultimately admixed with the combustible charge recurrently delivered into the firing chambers of the cylinders of the internal combustion engine M.

The amount of air drawn into the intake manifold I from the improved auxiliary air intake device may, of course, be metered or regulated to a particularly required or desired amount and by such predetermined supplying, it will be understood that a most effectual firing charge may be supplied to the engine cylinder firing chambers. Of course, this regulation of air flow or intake through my improved device ultimately to the engine cylinders is effected by turning the plug valve 9 in its seat in the casing 8 so as to regulate the size of passage or flow-way therethrough.

The check valve 11—12, obviously, permits of out-flowing of the auxiliary air supply into the intake manifold, but prevents any and all possible or back or reverse flowing of the same.

At this point, I desire that it shall be particularly noted that the sectional conduit 7, 7' and 7ᵃ has its internal diameter progressively reduced toward the engine intake manifold I. I have found that such progressive reduction of the internal diameter or flow-way of said sectional conduit line increases the degree of pressure under which the out-flowing of air from the conduit section 7ᵃ into the fitting 14 is effected, that such increase of pressure of the air discharged into said fitting materially and advantageously improves its flow from said fitting into the intake manifold and, quite as important, its thorough admixture or co-mingling with and/or dissemination in that combustible charge supplied to the engine intake manifold by the carburetor or charge forming device C, which as hereinbefore stated, has its primary air supply provided thereto by or through the air cleaner A.

Air supplied or delivered to an engine intake manifold equipped with my improved auxiliary air supply device will be positively or thoroughly freed of any foreign or other matters harmful to the engine and/or its functioning. Manifestly, as and when the cleaning liquid 15 within the cup 5 becomes dirty, it may readily be removed and replaced with other, simply by disconnecting said cup 5 from the open lower end of the device housing 1. Also, it may be here noted that according to atmospheric conditions, the amount of air flowing from the device housing 1 into and through the sectional conduit line 7—7'—7ᵃ will need appropriate regulation; this being readily and efficiently accomplished through adjustment of the aforesaid rotary plug valve 9.

I claim:

1. An auxiliary air supplying device for internal combustion engines, comprising a housing having inlet and outlet ways in the upper end portion thereof and its lower end open, an air inletting tube engaged through the way extended downwardly into the housing and opening thereinto, a fluid containing receptacle detachably connected to the lower open end of the housing receiving the lower end of said tube therein immersed in the fluid, a conduit having its internal diameter progressively reduced connected to and communicating with the housing outlet way, the remaining and internal diameter reduced end of said conduit connected to and directly communicating with the engine intake manifold, a metering valve interposed in said conduit, and a check valve interposed in the conduit beyond said metering valve.

2. An auxiliary air supplying device for internal combustion engines, comprising a housing having inlet and outlet ways in the upper portion thereof and its lower end open, an air inletting tube engaged through the inlet way extended downwardly into the housing and opening thereinto in proximity to its lower open end, a fluid containing cup releasably connected to the lower open end of the housing receiving the open lower end of said tube therein, a conduit having its internal diameter progressively reduced connected to and communicated with the housing outlet way, a fitting having an internal diameter greater than that of the outer end of said conduit and open at its opposite ends connected to and communicating with the engine intake manifold, said outer remaining internal diameter reduced end of said conduit connected to and directly communicating with said fitting intermediately of its opposite ends, a metering valve interposed in said conduit, and a check valve interposed in the conduit beyond said metering valve.

3. An auxiliary air supplying device for internal combustion engines, comprising a housing having inlet and outlet ways in one end portion thereof and its opposite end portion open, an air inletting tube engaged through the inlet way extended into and longitudinally of the housing and discharging thereinto in proximity to its open end, a fluid containing receptacle detachably connected to said open end of the housing, receiving said open end of the air inletting tube therein, a conduit having its internal diameter progressively reduced connected to and communicating with the housing outlet way, the remaining and internal diameter reduced end of said conduit being connected and communicating with the engine intake manifold, a metering valve interposed in said conduit, and a check valve interposed in the conduit beyond said metering valve movable from its seat by the application of suction applied through from the engine intake manifold.

FRANK BOYAN.

REFERENCES CITED

The following references are of record in the file of this patent:

UNITED STATES PATENTS

| Number | Name | Date |
|---|---|---|
| 1,142,779 | Umbarger | June 8, 1915 |
| 1,168,309 | Keiffer | Jan. 18, 1916 |
| 1,231,574 | De Clairmont | July 3, 1917 |
| 1,345,432 | Clayton | July 6, 1920 |
| 2,169,622 | Weiertz et al. | Aug. 15, 1939 |
| 2,518,082 | Shively | Aug. 8, 1950 |

FOREIGN PATENTS

| Number | Country | Date |
|---|---|---|
| 681,316 | France | May 13, 1930 |